US011862009B2

(12) United States Patent
Kim

(10) Patent No.: US 11,862,009 B2
(45) Date of Patent: Jan. 2, 2024

(54) POWER-SAVING CONTROL SYSTEM USING REMOTE-CONTROL COMMUNICATION

(71) Applicant: UNILUX INC., Gyeonggi-do (KR)

(72) Inventor: Jung Ho Kim, Seoul (KR)

(73) Assignee: UNILUX INC., Seongnam-si (KR)

( * ) Notice: Subject to any disclaimer, the term of this patent is extended or adjusted under 35 U.S.C. 154(b) by 0 days.

(21) Appl. No.: 17/619,233

(22) PCT Filed: Jun. 15, 2020

(86) PCT No.: PCT/KR2020/007699
§ 371 (c)(1),
(2) Date: Dec. 14, 2021

(87) PCT Pub. No.: WO2021/006492
PCT Pub. Date: Jan. 14, 2021

(65) Prior Publication Data
US 2022/0246026 A1  Aug. 4, 2022

(30) Foreign Application Priority Data
Jul. 11, 2019  (KR) .................. 10-2019-0083689

(51) Int. Cl.
*G08C 17/02* (2006.01)
*H05B 47/19* (2020.01)

(52) U.S. Cl.
CPC ............ *G08C 17/02* (2013.01); *H05B 47/19* (2020.01); *G08C 2201/91* (2013.01)

(58) Field of Classification Search
CPC .... G08C 17/02; G08C 2201/91; H05B 47/19; H04Q 9/00; F21V 23/0435
See application file for complete search history.

(56) References Cited

U.S. PATENT DOCUMENTS 8,203,445 B2 *  6/2012  Recker .................. H05B 45/20
315/159

FOREIGN PATENT DOCUMENTS

| KR | 20050111475 A | 11/2005 |
| KR | 101081911 B1 | 11/2011 |
| KR | 20120081831 A | 7/2012 |
| KR | 20140024563 A | 3/2014 |
| KR | 101670285 B1 | 10/2016 |
| KR | 102095285 B1 | 3/2020 |

OTHER PUBLICATIONS

PCT/KR2020/007699. International Search Report dated Sep. 21, 2020.

* cited by examiner

*Primary Examiner* — Vernal U Brown
(74) *Attorney, Agent, or Firm* — LOZA & LOZA LLP

(57) ABSTRACT

An aspect of the disclosure relates to a power-saving control system using remote-control communication. In this power-saving control system, a remote-control transmitting device is embedded in one of a lighting device, a sensor, and a sensor-embedded program switch, which are installed in a space, so as to remotely control a control target device installed in the corresponding space, and a predetermined control signal such as a power-off command is transmitted to the control target device if no person exists in the space for a predetermined time, or if a measured temperature or the like satisfies a condition, such that the control target device can be remotely controlled.

11 Claims, 5 Drawing Sheets

POWER-SAVING CONTROL SYSTEM USING REMOTE-CONTROL COMMUNICATION

CROSS-REFERENCE TO RELATED APPLICATIONS

This application is the U.S. national stage of International Patent Application No. PCT/KR2020/007699, filed on Jun. 15, 2020 and entitled "POWER-SAVING CONTROL SYSTEM USING REMOTE-CONTROL COMMUNICATION", which claims priority to Korean Patent Application No. 10-2019-0083689 filed on Jul. 11, 2019 at the Korean Intellectual Property Office. The disclosure of the foregoing applications is incorporated herein by reference in its entirety.

TECHNICAL FIELD

The present invention relates to a power-saving control system using remote-control communication, which can remotely control a control target device installed in one space by embedding, in any one of a lighting instrument, a sensor or a program switch installed in the space, remote-control transmission means for remotely controlling the control target device, measuring whether a person is not present for a given time, a temperature, etc. in the space, and transmitting a given control signal, such as a power-off command, to the control target device when a condition is established.

BACKGROUND ART

Recently, a technology for reducing energy by automatically making off power of a light, an air-conditioner, or various electrical and home appliances (hereinafter referred to as an electrical product) installed in a space, such as a building, a factory, or an office, when a person is not present in a space in order to reduce energy is widely used.

However, such an energy-saving technology has a burden of a cost attributable to a change in the existing system and is basically a technology for directly making on or off power of an electrical product, thus having a problem in that a product suffers from stress and lifespan thereof is reduced.

Meanwhile, a lighting system capable of reducing power through efficient management of lights is provided to a space where many lights are installed, such as a building, a factory, or an office. The lighting system creates effects called convenience and a cost reduction by very efficiently controlling lights by using a central control unit, a program switch, etc.

While researching such a lighting system, the inventor of the present disclosure has reached the present disclosure capable of reducing energy by remotely controlling electrical products installed in a particular space by using a previously installed lighting system without adding a high cost.

DISCLOSURE

Technical Problem

The present disclosure has been invented under the background, and an object of the present disclosure is to provide a power-saving control system using remote-control communication, which can remotely control a control target device installed in a particular space by embedding, in any one of a lighting instrument, a sensor or a program switch installed in the particular space, remote-control transmission means for remotely controlling the control target device, measuring whether a person is not present for a given time, a temperature, etc. in the space, and transmitting a given control signal, such as a power-off command, to the control target device when a condition is established.

Technical Solution

In the present disclosure for achieving such an object, remote-control transmission means for remotely controlling a control target device installed in one space is embedded in any one of a lighting instrument, a sensor and a program switch installed in the space, when a signal indicating that the space is maintained in an unmanned state or at a given temperature for a given time is received, a given remote-control signal is transmitted to the control target device through the remote-control transmission means, the lighting instrument, the sensor and the program switch transmits a given remote-control signal to the control target device when receiving, from a sensor embedded therein or the sensor, a signal indicating that the space is maintained in the unmanned state or at a given temperature for a given time, and the control target device includes remote-control reception means for receiving a control signal transmitted by the remote controller transmission means.

Furthermore, according to the present disclosure, the control signal has a function for performing a corresponding remote-control of the control target device.

Furthermore, according to the present disclosure, the lighting instrument includes a lighting unit including a lamp and configured to perform a function as a lamp; a first controller configured to output, to a first remote-control communication unit, a transmission command for transmitting a given control signal stored in a first DB to the control target device, when a sensing signal received from the sensor indicates that the inside of the space is maintained in the unmanned state or at a given temperature for a given time; the first DB configured to store control signal data for driving the control target device; and the first remote-control transmitter configured to convert, into a remote-control communication signal, the control signal stored in the first DB and wirelessly transmit the remote-control communication signal, in response to a command from the first controller.

Furthermore, according to the present disclosure, the sensor includes a sensor unit including a human body sensing sensor and a temperature sensor; a second controller configured to transmit, to a second remote-control communication unit, a transmission command for transmitting a given control signal stored in a second DB to the control target device, when a sensing signal received from the sensor indicates that the inside of the space is maintained in the unmanned state or at a given temperature for a given time; the second DB configured to store control signal data for driving the control target device; and the second remote-control transmitter configured to convert, into a remote-control communication signal, the control signal stored in the second DB and wirelessly transmit the remote-control communication signal, in response to a command from the second controller.

Furthermore, according to the present disclosure, the program switch includes a switch unit including switches for light control; a third controller configured to output, to a third remote-control communication unit, a transmission command for transmitting a given control signal stored in a third DB to the control target device, when a sensing signal received from the sensor indicates that the inside of the space is maintained in the unmanned state or at a given temperature for a given time; the third DB configured to store control signal data for driving the control target device; and the third remote-control transmitter configured to convert, into a remote-control communication signal, the control signal stored in the third DB and wirelessly transmit the remote-control communication signal, in response to a command from the third controller.

Furthermore, in the present disclosure, a lighting instrument, a sensor and a program switch installed in one space are connected to a control system for lighting control through communication means C, remote-control transmission means for remotely controlling a control target device installed in the space is embedded in any one of the lighting instrument, the sensor and the program switch, when receiving a signal indicating that the space is maintained in an unmanned state or at a given temperature for a given time, any one of the lighting instrument, the sensor and the program switch receives a remote-control signal through the control system and transmits a given remote-control signal to the control target device through the remote-control transmission means, a first communication unit to a third communication unit connected to the control system through the communication means C are further configured in the lighting instrument, the sensor and the program switch, respectively, and the control system includes a main communication unit connected to the first communication unit to the third communication unit through the communication means C, a main controller configured to transmit, to the main communication unit, a transmission command for transmitting a given control signal stored in a DB unit to the control target device when a sensing signal of the lighting instrument, the sensor and the program switch received from the main communication unit indicates that the inside of the space is maintained in the unmanned state or at a given temperature for a given time, and the DB unit configured to store control signal data for driving the control target device.

Furthermore, according to the present disclosure, the control system is capable of receiving an infrared signal generated by a remote-control of the control target device through a remote controller signal reader and storing remote-control data in the DB unit through the learning function.

Advantageous Effect

As described above, the present disclosure provides an advantage in that it prevents unnecessary energy consumption of an electrical product installed in a corresponding space and also greatly reduces an implementation cost of an energy-saving system through a very simple method by using a previously installed lighting system.

Furthermore, the present disclosure provides an advantage in that it can remotely control a control target device installed in one space by embedding, in any one of a lighting instrument, a sensor or a program switch installed in the space, remote-control transmission means for remotely controlling the control target device, measuring whether a person is not present for a given time, a temperature, etc. in the space, and transmitting a given control signal, such as a power-off command, to the control target device when a condition is established.

DETAILED DESCRIPTION

Hereinafter, preferred embodiments of the present disclosure are described in detail with reference to the accompanying drawings.

Figure 1:
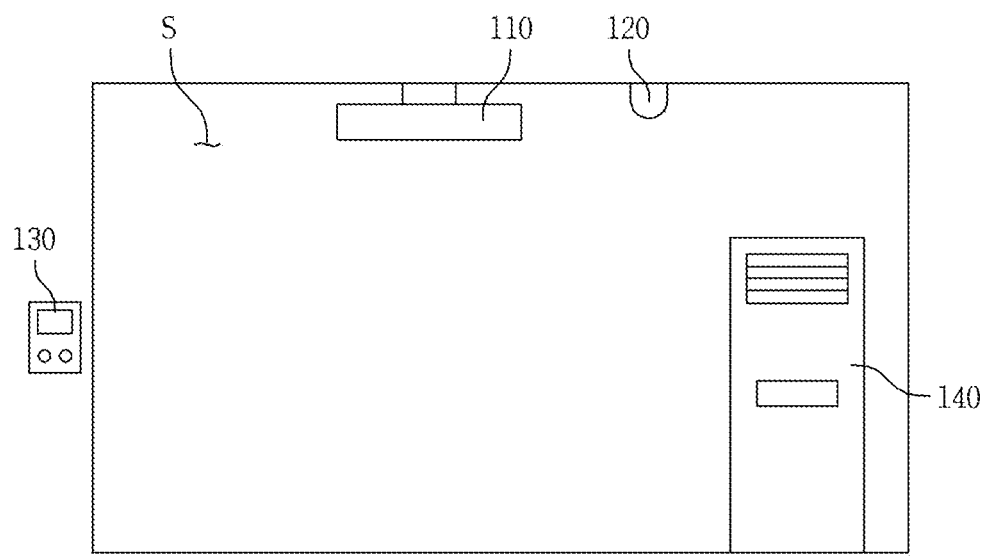
FIG. 1 is a configuration diagram of a power-saving control system using remote-control communication according to a first embodiment of the present disclosure.

FIG. 1 is a configuration diagram of a power-saving control system using remote-control communication according to a first embodiment of the present disclosure.

As illustrated, the power-saving control system using remote-control communication according to the present disclosure is configured to embed, in any one of a lighting instrument 110, a sensor 120 and a program switch 130 installed in one space S, remote-control transmission means for remotely controlling a control target device 140 installed in the space S.

In this case, the lighting instrument 110 may be a ceiling light installed in the ceiling of the space S, etc. The sensor 120 may be a human body sensing sensor or a temperature sensor, and senses a manned or unmanned state in the space S by directly sensing a person or a temperature and provides a sensed signal to the lighting instrument 110 or the program switch 130.

The program switch 130 is a switch for outputting a command to control the lighting instrument 110.

The control target device 140 may be an air-conditioning apparatus, such as an air-conditioner, or electrical and home appliances, such as an electric blinder or TV, which are installed in the space S, and is equipped with remote-control reception means for receiving a remote-control signal from the remote-control transmission means.

The remote-control transmission means is means for transmitting a remote-control signal to remotely control the control target device 140, and includes an infrared LED or a wireless communication device.

Furthermore, the lighting instrument 110 and the program switch 130 may be configured in a form in which a sensor (human body sensing or temperature sensing) is embedded therein.

The present disclosure includes a construction for transmitting a given control signal to the control target device 140 by using the remote-control transmission means embedded in any one of the lighting instrument 110, the sensor 120 and the program switch 130, according to a schedule according to a sensed value and corresponding preset control contents, or over a time, or in response to an artificial manipulation according to a need when any sensing signal (manned or unmanned state) is generated in the space S through the human body sensing sensor or the temperature sensor.

The control signal may be transmitted by any one of the lighting instrument 110, the sensor 120 and the program switch 130 or may be transmitted in response to a command from the control system 150 to be described later.

The contents of the control signal may include a function performed by a corresponding remote controller of the control target device 140, such as a power-on/off command or a wind setting command of the control target device 140.

Furthermore, the control signal may be configured in a way that various corresponding remote-control data of the control target device 140 is databased (DB) and embedded and configured and used as a signal suitable for the corresponding control target device 140 or the signal is received from a corresponding remote controller of the control target device 140 and stored, memorized and used.

Figure 2:
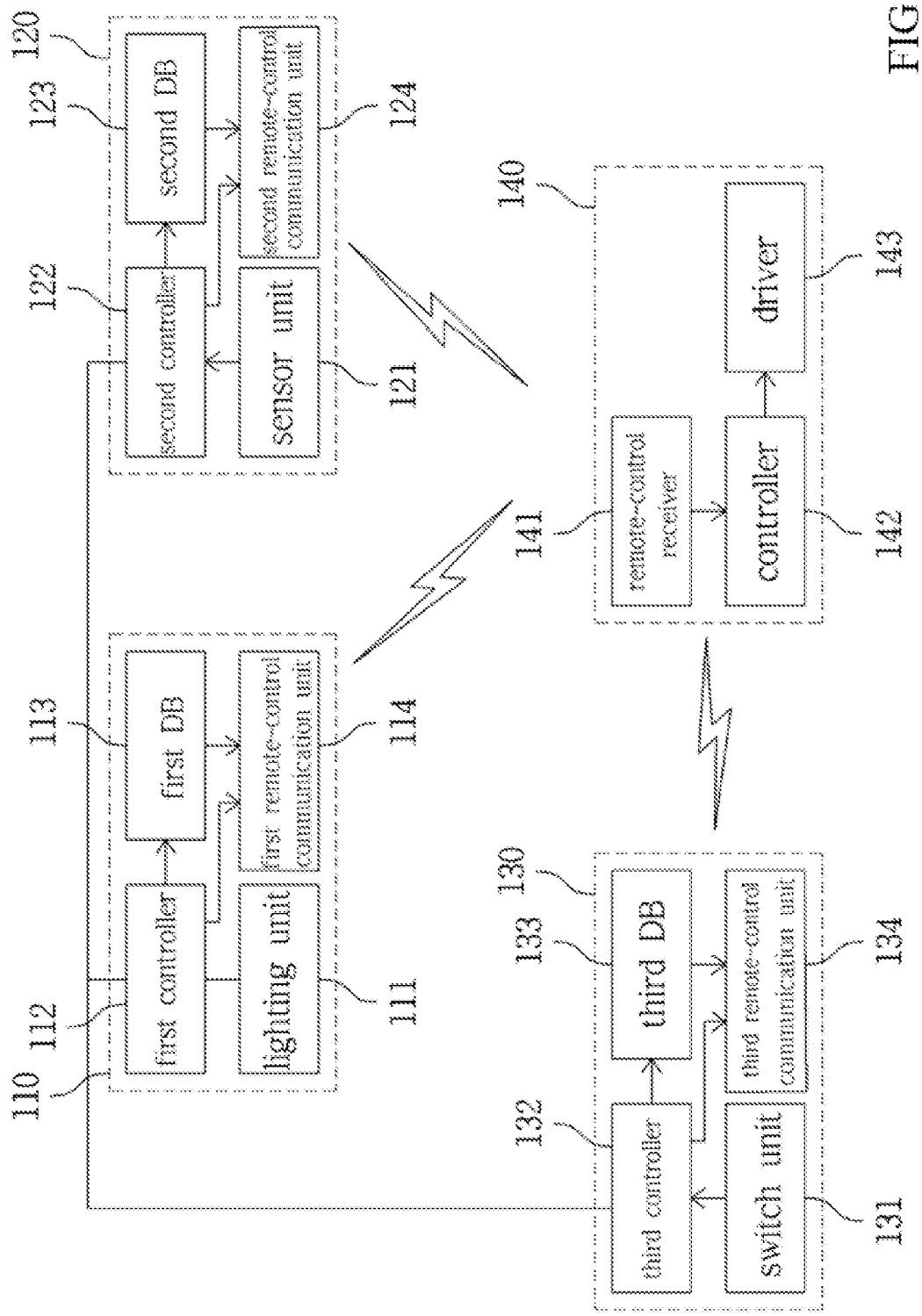
FIG. 2 is a circuit block diagram of the power-saving control system using remote-control communication according to the first embodiment of the present disclosure.

Detailed constructions of the lighting instrument 110, the sensor 120, the program switch 130 and the control target device 140 are described with reference to FIG. 2.

The lighting instrument 110 is an element connected to the sensor 120 and for transmitting a given remote-control signal to the control target device 140 when receiving, from the sensor 120, a signal indicating that the space S is maintained in an unmanned state or at a given temperature for a given time.

The lighting instrument 110 includes a lighting unit 111 including a lamp and performing a function as a lamp, a first controller 112 for outputting, to a first remote-control communication unit 114, a transmission command for transmitting a given control signal stored in a first DB 113 to the control target device 140 when a sensing signal received from the sensor 120 indicates that the inside of the space S is maintained in the unmanned state or at a given temperature for a given time, the first DB 113 storing control signal data for driving the control target device 140, and the first remote-control transmitter 114 converting, into a remote-control communication signal, the control signal stored in the first DB 113 and wirelessly transmitting the remote-control communication signal, in response to a command from the first controller 112.

The sensor 120 includes a human body sensing sensor or a temperature sensor, and is an element for transmitting a given remote-control signal to the control target device 140 when the space S is maintained in the unmanned state or at a given temperature for a given time.

The sensor 120 includes a sensor unit 121 including a human body sensing sensor and a temperature sensor, when a sensing signal received from the sensor 120 indicates that the inside of the space S is maintained in the unmanned state or at a given temperature for a given time, a second controller 122 for transmitting, to a second remote-control communication unit 124, a transmission command for transmitting a given control signal stored in the second DB 123 to the control target device 140, the second DB 123 storing control signal data for driving the control target device 140, and the second remote-control transmitter 124 converting, into a remote-control communication signal, the control signal stored in the second DB 123 and wirelessly transmitting the remote-control communication signal, in response to a command from the second controller 122.

The program switch 130 is connected to the sensor 120, and is an element for transmitting a given remote-control signal to the control target device 140 when receiving, from the sensor 120, a signal indicating that the space S is maintained in the unmanned state or at a given temperature for a given time.

The program switch 130 includes a switch unit 131 including switches for light control, a third controller 132 for outputting, to a third remote-control communication unit 134, a transmission command for transmitting a given control signal stored in a third DB 133 to the control target device 140, when a sensing signal received from the sensor 120 indicates that the inside of the space S is maintained in the unmanned state or at a given temperature for a given time, the third DB 133 storing control signal data for driving the control target device 140, and the third remote-control transmitter 134 converting the control signal stored in the third DB 133 into a remote-control communication signal and wirelessly transmitting the remote-control communication signal, in response to a command from the third controller 132.

The control target device 140 includes a remote-control receiver 141 receiving control signals transmitted by the remote-control transmitters of the lighting instrument 110, the sensor 120 and the program switch 130, and a controller 142 controlling a driver 143 by analyzing a control signal received through the remote-control receiver 141.

In this case, first, a method of managing and storing control signal data in the first DB to the third DB 113, 123, and 133 may be a method of storing, in each of the first DB to the third DB 113, 123, and 133, all of pieces of common remote-control signal information including a remote-control signal of the control target device 140 or storing all of pieces of common remote-control signal information in a control system to be described later.

Second, the method may be a method of storing only a remote-control signal of the control target device 140. Third, the method may be a method of managing a remote-control signal only in the control system and transmitting, to any one of the lighting instrument 110, the sensor 120, and the program switch 130, a remote-control signal to be transmitted upon control and transmitting, to the control target device 140, a remote-control signal received by a device selected among the lighting instrument 110, the sensor 120, and the program switch 130 without any change.

A general operation according to the first embodiment of the present disclosure constructed described above is described.

First, the lighting instrument 110 that is a lighting system, the sensor 120, and the program switch 130 are installed in the one space S. Remote-control transmission means for remotely controlling the control target device 140 installed in the space S is provided in any one of the lighting instrument 110, the sensor 120, and the program switch 130.

In this case, for example, it is described that the sensor 120 is equipped with the second remote-control transmitter 124, that is, remote-control transmission means.

The sensor 120 senses whether a person is present in the space S through the human body sensing sensor of the sensor unit 121, and senses a temperature in the space S through the temperature sensor.

When the inside of the space S is sensed as being in the unmanned state for a given time or a temperature within the space S is sensed as a given temperature for a given time as a result of the sensing of the sensor unit 121, the second controller 122 performs control for transmitting, to the control target device 140, a remote-control signal for the control target device 140 corresponding to the sensing signal.

Accordingly, the second controller 122 outputs, to the second remote-control communication unit 124, a transmission command for transmitting the remote-control signal stored in the second DB 123 to the control target device 140.

In this case, the remote-control signal may be a power-off command for the control target device 140.

Accordingly, the second remote-control transmitter 124 converts, into a remote-control communication signal, the control signal stored in the second DB 123 and wirelessly transmits the remote-control communication signal to the control target device 140, in response to a command from the second controller 122.

The control target device 140 receives the remote-control signal from the second remote-control transmitter 124 through the remote-control receiver 141. The controller 142 stops the driving of the driver 143.

As a result, when a given time for which the space S is maintained in the unmanned state elapses, an air-conditioner such as an air-conditioner is automatically off, thus proving an effect in that energy is reduced.

Figure 3:
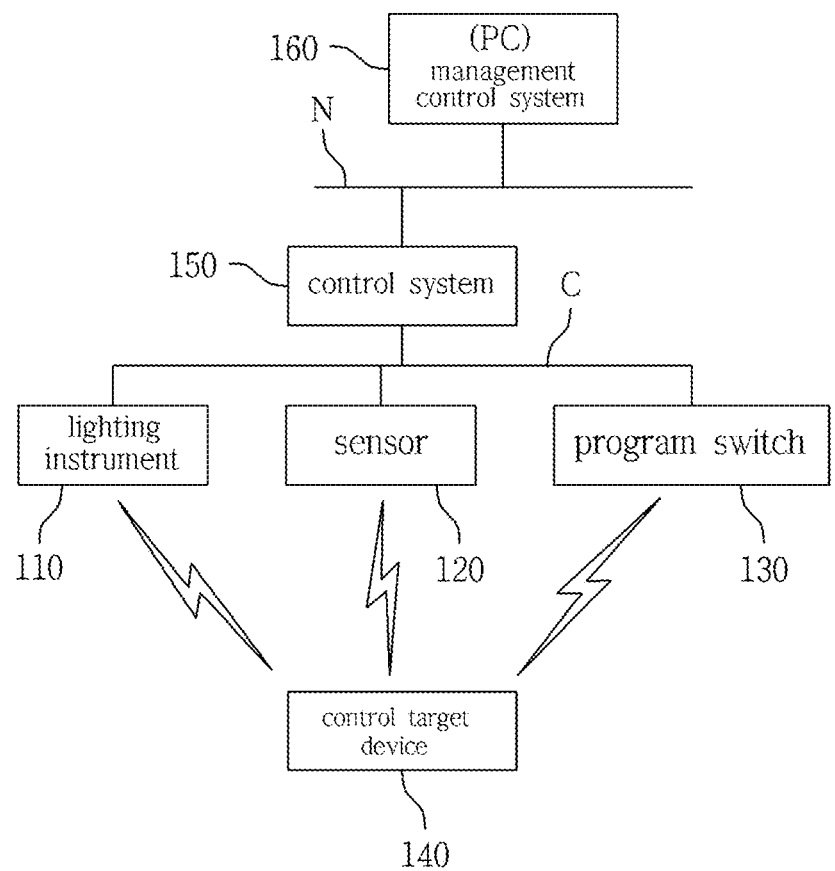
FIG. 3 is a block diagram of a remote control system using remote-control communication according to a second embodiment of the present disclosure.
Figure 4:
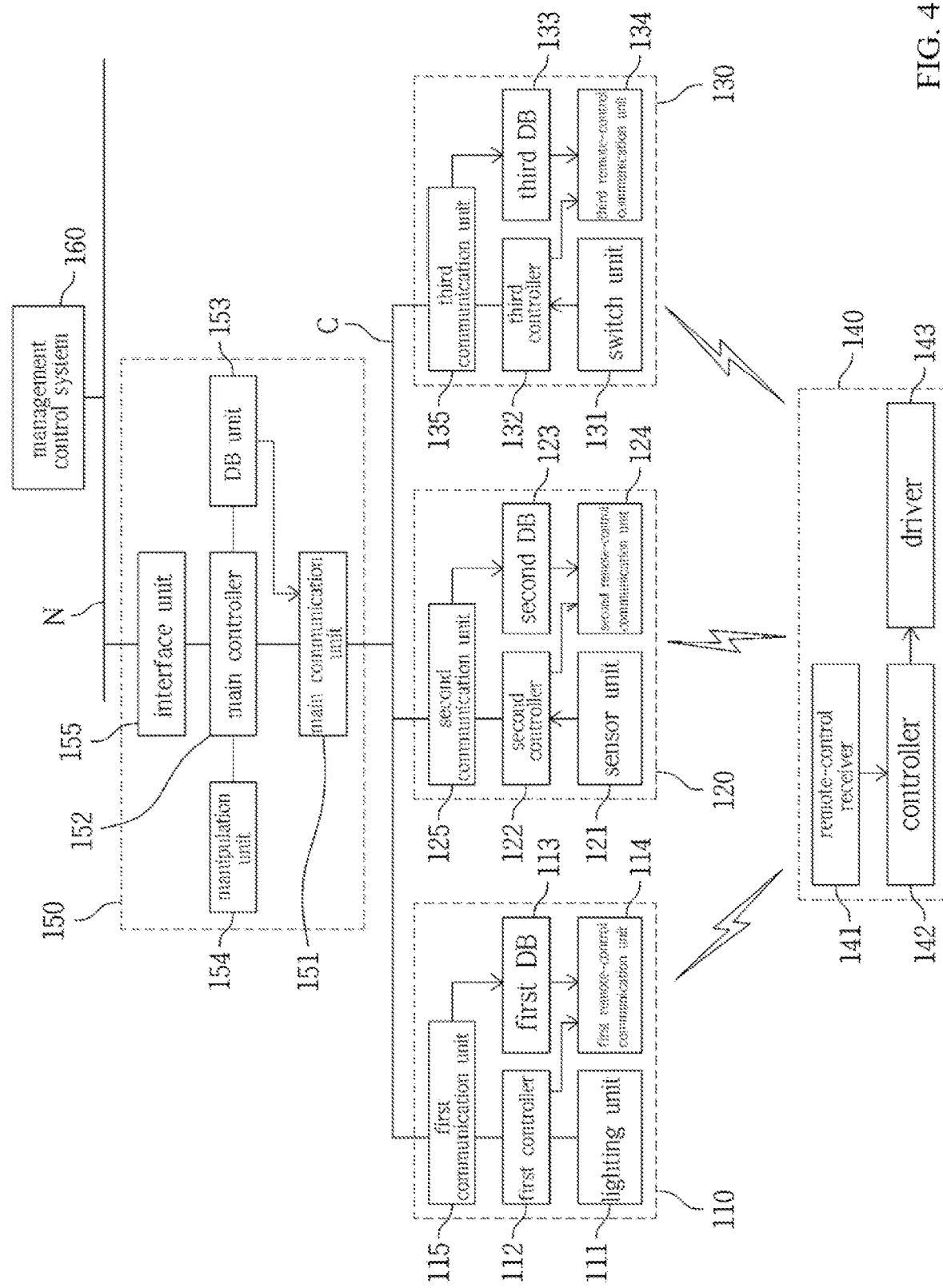
FIG. 4 is a detailed circuit block diagram of the remote control system using remote-control communication according to the second embodiment of the present disclosure.

FIG. 3 is a block diagram of a remote control system using remote-control communication according to a second embodiment of the present disclosure. FIG. 4 is a detailed circuit block diagram of the remote control system using remote-control communication according to the second embodiment of the present disclosure.

As illustrated, the power-saving control system using remote-control communication according to the second embodiment of the present disclosure has a construction in which as described above, the lighting instrument 111, the sensor 120 and the program switch 130 installed in the one space S are connected to a control system 150 for lighting control, receives a remote-control signal through the control system 150, and transmits the remote-control signal to the control target device 140.

Accordingly, the lighting instrument 111, the sensor 120 and the program switch 130 further include a first communication unit to a third communication unit 115, 125, and 135 connected to the first controller to the third controller 112, 122, and 132, respectively. The first communication unit to the third communication unit 115, 125, and 135 are connected to the control system 150 through communication means C.

In this case, the communication means C may be any one of power line communication, wireless communication and wired communication.

The control system 150 includes a main communication unit 151 connected to the first communication unit to the third communication unit 115, 125, and 135 through the communication means C, a main controller 152 for outputting, to the main communication unit 151, a transmission command for transmitting a given control signal stored in a DB unit 153 to the control target device 140 when a sensing signal of any one of the lighting instrument 111, the sensor 120 and the program switch 130 received from the main communication unit 151 indicates that the inside of the space S is maintained in the unmanned state or at a given temperature for a given time, and the DB unit 153 storing control signal data for driving the control target device 140.

Furthermore, the control system 150 further includes a manipulation unit 151 for inputting a given key command to the main controller 152 and an interface unit 155 connected to a management control system 160 over a network N.

In an operation according to the second embodiment of the present disclosure constructed as above, it is described that the sensor 120 is equipped with the second remote-control transmitter 124, that is, remote-control transmission means.

The sensor 120 senses whether a person is present within the space S through the human body sensing sensor of the sensor unit 121 and detects a temperature within the space S through the temperature sensor.

When the inside of the space S is sensed as being in the unmanned state for a given time or a temperature within the space S is sensed as a given temperature for a given time as a result of the sensing of the sensor unit 121, the second controller 122 transmits the sensing signal of the sensor unit 121 to the main communication unit 151 of the control system 150 through the second communication unit 125.

The main controller 152 of the control system 150 receives a sensing signal of the sensor 120 through the main communication unit 151, and performs control for transmitting, to the control target device 140, a remote-control signal for the control target device 140 corresponding to the sensing signal of the sensor 120.

Accordingly, the main controller 152 transmits, to the sensor unit 120, the remote-control signal stored in the DB unit 153 through the main communication unit 151.

Accordingly, the remote-control signal is inputted to the second communication unit 125 of the sensor 120 through the communication means C. The second controller 122 outputs, to the second remote-control transmitter 124, the remote-control signal received through the second communication unit 125.

The second remote-control transmitter 124 converts, into a remote-control communication signal, the remote-control signal transmitted by the second controller 122, and wirelessly transmits the remote-control communication signal.

Figure 5:
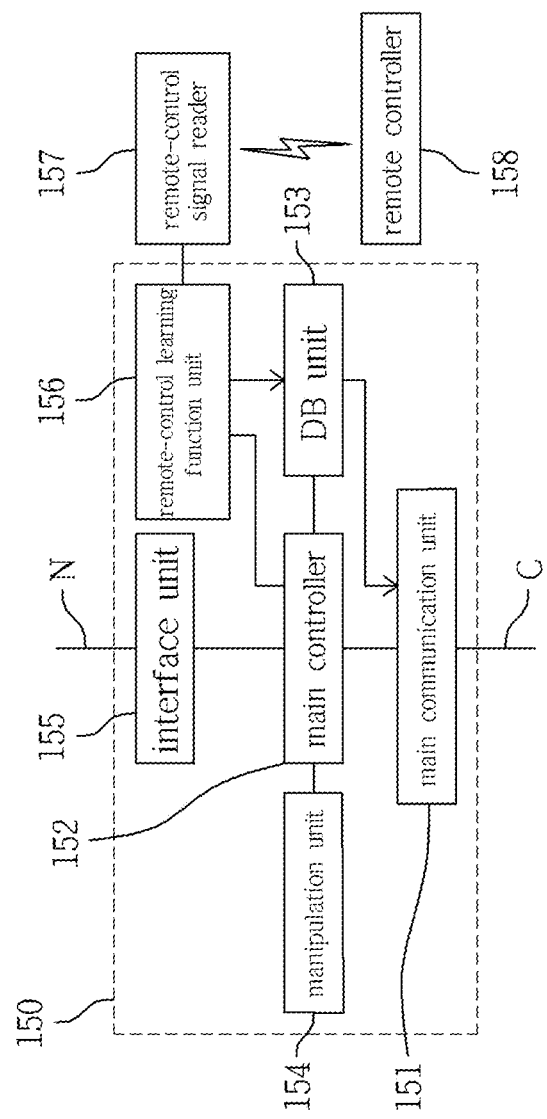
FIG. 5 is an embodiment in which a remote-control signal is learnt according to the present disclosure.

Furthermore, the control system 150 may further include a remote-control learning function unit 156 as in FIG. 5.

The remote-control learning function unit 156 is configured to receive an infrared signal generated by a remote controller 158 of the control target device 140 through a remote-control signal reader 157 and to input remote-control data through a learning function, and is configured to additionally input remote-control data stored in the DB unit 153 and not included in a standard database.

As described above, the present disclosure provides an effect in that it prevents unnecessary energy consumption of an electrical product installed in a corresponding space and greatly reduces costs for implementing an energy-saving system through a very simple method by using a previously installed lighting system.

Furthermore, the present disclosure provides an advantage in that it can remotely control a control target device installed in one space by embedding, in any one of a lighting instrument, a sensor or a program switch installed in the space, remote-control transmission means for remotely controlling the control target device, measuring whether a person is not present for a given time, a temperature, etc. in the space, and transmitting a given control signal, such as a power-off command, to the control target device when a condition is established.

The invention claimed is:

1. A power-saving control system using remote-control communication, comprising:
   a control target device configured to receive a control signal; and
   remote-control transmission means for remotely controlling the control target device installed in a defined space, wherein the remote-control transmission means is embedded in at least one of a lighting instrument, a sensor, or a program switch installed in the defined space, the control target device being separate from the lighting instrument, the sensor, and the program switch,
   wherein when receiving a signal indicating that the defined space is maintained in an unmanned state or at a defined temperature for a defined time, the remote-control transmission means is configured to transmit a given remote-control signal to the control target device, and wherein the at least one of the lighting instrument, the sensor and the program switch is configured to transmit the given remote-control signal to the control target device when receiving, from an embedded sensor embedded therein or the sensor, a signal indicating that the defined space is maintained in the unmanned state or at the defined temperature for the defined time, wherein the control target device comprises remote-control reception means for receiving a control signal transmitted by the remote-control transmission means, and wherein the lighting instrument comprises:
 a lighting unit comprising a lamp and configured to perform a function as a lamp;
 a first controller configured to output, to a first remote-control communication unit, a transmission command for transmitting a given control signal stored in a first database to the control target device, when a sensing signal received from the sensor indicates that an inside of the space is maintained in the unmanned state or at a given temperature for a given time;
 the first database configured to store control signal data for driving the control target device; and
 the first remote-control communication unit configured to convert, into a first remote-control communication signal, the control signal data stored in the first database and wirelessly transmit the first remote-control communication signal to the control target device, in response to the transmission command from the first controller.

2. The power-saving control system of claim 1, wherein the control signal has a function for operating a corresponding remote controller of the control target device.

3. The power-saving control system of claim 1, wherein the sensor comprises:
 a sensor unit comprising a human body sensing sensor and a temperature sensor;
 a second controller configured to transmit, to a second remote-control communication unit, a transmission command for transmitting a given control signal stored in a second database to the control target device, when a sensing signal received from the sensor unit of the sensor indicates that an inside of the space is maintained in the unmanned state or at a given temperature for a given time;
 the second database configured to store control signal data for driving the control target device; and
 the second remote-control communication unit configured to convert, into a second remote-control communication signal, the control signal data stored in the second database and wirelessly transmit the second remote-control communication signal to the control target device, in response to the transmission command from the second controller.

4. The power-saving control system of claim 1, wherein the program switch comprises:
 a switch unit comprising switches for light control;
 a third controller configured to output, to a third remote-control communication unit, a transmission command for transmitting a given control signal stored in a third database to the control target device, when a sensing signal received from the sensor indicates that an inside of the space is maintained in the unmanned state or at a given temperature for a given time;
 the third database configured to store control signal data for driving the control target device; and
 the third remote-control communication unit configured to convert, into a third remote-control communication signal, the control signal data stored in the third database and wirelessly transmit the third remote-control communication signal to the control target device, in response to the transmission command from the third controller.

5. The power-saving control system of claim 1, wherein the control target device is a home appliance, and the control signal is associated with a non-lighting feature of the home appliance.

6. A power-saving control system using remote-control communication, comprising:
 a control system connected to a lighting instrument, a sensor and a program switch installed in a defined space, wherein the lighting instrument, the sensor, and the program switch are connected to the control system for lighting control through communication means;
 a control target device configured to receive a control signal;
 remote-control transmission means for remotely controlling the control target device installed in the defined space is embedded in at least one of the lighting instrument, the sensor, or the program switch,
 wherein when receiving a signal indicating that the defined space is maintained in an unmanned state or at a defined temperature for a defined time, the at least one of the lighting instrument, the sensor and the program receives a remote-control signal through the control system and transmits a given remote-control signal to the control target device through the remote-control transmission means,
 wherein a first communication unit, a second communication unit, and a third communication unit connected to the control system through the communication means are further configured in the lighting instrument, the sensor and the program switch, respectively, and
 wherein the control system comprises
 a main communication unit connected to the first communication unit, the second communication unit, and the third communication unit through the communication means,
 a database unit configured to store control signal data for driving the control target device, and
 a main controller configured to transmit, to the main communication unit, a transmission command for transmitting a given control signal stored in a database unit to the control target device when a sensing signal of the at least one of the lighting instrument, the sensor and the program switch received from the main communication unit indicates that an inside of the defined space is maintained in the unmanned state or at the defined temperature for the defined time.

7. The power-saving control system of claim 6, wherein the control system is configured to receive an infrared signal generated by a remote controller of the control target device through a remote-control signal reader and to store remote-control data in the database unit through a learning function.

8. A power-saving control system using remote-control communication, comprising:

a control target device configured to receive a control signal, wherein the control signal has a function for operating a corresponding remote controller of the control target device; and remote-control transmission means for remotely controlling the control target device installed in a defined space, wherein the remote-control transmission means is embedded in at least one of a lighting instrument, a sensor, or a program switch installed in the defined space, the control target device being separate from the lighting instrument, the sensor, and the program switch, wherein when receiving a signal indicating that the defined space is maintained in an unmanned state or at a defined temperature for a defined time, the remote-control transmission means is configured to transmit a given remote-control signal to the control target device, and wherein the at least one of the lighting instrument, the sensor and the program switch is configured to transmit the given remote-control signal to the control target device when receiving, from an embedded sensor embedded therein or the sensor, a signal indicating that the defined space is maintained in the unmanned state or at the defined temperature for the defined time, wherein the control target device comprises remote-control reception means for receiving a control signal transmitted by the remote-control transmission means, wherein the lighting instrument comprises:
  a lighting unit comprising a lamp and configured to perform a function as a lamp;
  a first controller configured to output, to a first remote-control communication unit, a transmission command for transmitting a given control signal stored in a first database to the control target device, when a sensing signal received from the sensor indicates that an inside of the space is maintained in the unmanned state or at a given temperature for a given time;
  the first database configured to store control signal data for driving the control target device; and
  the first remote-control communication unit configured to convert, into a first remote-control communication signal, the control signal data stored in the first database and wirelessly transmit the first remote-control communication signal to the control target device, in response to the transmission command from the first controller, wherein the sensor comprises:
  a sensor unit comprising a human body sensing sensor and a temperature sensor;
  a second controller configured to transmit, to a second remote-control communication unit, a transmission command for transmitting a given control signal stored in a second database to the control target device, when a sensing signal received from the sensor unit indicates that an inside of the space is maintained in the unmanned state or at a given temperature for a given time;
  the second database configured to store control signal data for driving the control target device; and
  the second remote-control communication unit configured to convert, into a second remote-control communication signal, the control signal data stored in the second database and wirelessly transmit the second remote-control communication signal to the control target device, in response to the transmission command from the second controller; and wherein the program switch comprises:
  a switch unit comprising switches for light control;
  a third controller configured to output, to a third remote-control communication unit, a transmission command for transmitting a given control signal stored in a third database to the control target device, when a sensing signal received from the sensor indicates that an inside of the space is maintained in the unmanned state or at a given temperature for a given time;
  the third database configured to store control signal data for driving the control target device; and
  the third remote-control communication unit configured to convert, into a third remote-control communication signal, the control signal data stored in the third database and wirelessly transmit the third remote-control communication signal to the control target device, in response to the transmission command from the third controller.

9. The power-saving control system of claim 8, wherein the control signal has a function for operating a corresponding remote controller of the control target device.

10. The power-saving control system of claim 8, wherein the first database, second data base, and the third database store common remote-control signal information for the control target device, the common remote-control signal information including the control signal for the control target device.

11. The power-saving control system of claim 8, wherein the control target device is a home appliance, and the control signal is associated with a non-lighting feature of the home appliance.

* * * * *